United States Patent Office.

FRANZ DIETRICH, OF MUNICH, GERMANY.

MANUFACTURE OF CREAM OF TARTAR.

SPECIFICATION forming part of Letters Patent No. 294,592, dated March 4, 1884.

Application filed October 23, 1883. (No specimens.)

*To all whom it may concern:*

Be it known that I, FRANZ DIETRICH, a subject of the Emperor of Germany, and residing at Munich, Germany, have invented new and useful Improvements in the Manufacture of Cream of Tartar, of which the following is a specification.

The object of this invention is the production of cream of tartar of the best quality directly from crude tartar or argol.

The invention is based upon the fact that iron and alumina are always present in argols, which prevent the production of good cream of tartar, and are the chief cause of the loss in manufacture, and that these bodies are precipitated and removed in the form of phosphates of iron and alumina by treating the argols in solution with phosphoric acid or its compounds. This precipitation and removal of phosphates goes on partly in the hot and partly in the cooled solution. The precipitation is not complete, but fully sufficient for the success of my process.

The invention thus chiefly consists in all operations which are necessary for the transformation of crude tartar or argol into cream of tartar being carried on in the presence of certain large amount of phosphoric acid, or of any suitable phosphate, or of a mixture thereof.

I operate in the following manner: The argols are dissolved, as usual, in water or mother lye. To this solution is added about fifteen per cent., more or less, (of the weight of the argols,) of phosphoric acid, (anhydrous,) or more in proportion of phosphoric acid in solution. The whole is then boiled until all the tartar is dissolved. Hereupon the liquid is cleared with pipe-clay, or any other clearing substance which produces no decomposition of the citartrate. The hot solution is then placed in another vessel and decolorized with animal charcoal which has been purified with muriatic acid or in other suitable manner. Any other decolorizing substance, however, can be used, provided it does not cause decomposition of the citartrate. In place of the foregoing, the solution of argols can be first decolorized with animal charcoal, then cleared with pipe-clay, and the clear hot fluid placed in another vessel. Then the solution is cleared again with pipe-clay or any other suitable clearing substance, in order to precipitate the last traces of charcoal-dust and other impurities. Lastly, the whole is mixed with a very small amount—one-half to one per cent., more or less, (of the weight of the argols)—of yellow prussiate of potash, in order to remove the very small traces of copper, iron, and other bodies, which can thus be precipitated. This being done, the solution is left undisturbed for clearing and drawn off for crystallization. In this manner cream of tartar of the best quality is produced in large, bright, colorless crystals, in most cases a so-called "chemically pure" product, as the tartrate of lime out of the argols separates for itself, and is found as residue. A quantity of the phosphoric acid contained in the mother-lye is consumed by the formation of phosphates. This quantity corresponds exactly with the amount of precipitated oxides of iron and alumina. The quantity of phosphoric acid is therefrom continually diminishing, as the mother-lye, as it is well known, is used over and over again. It is therefore necessary to examine the mother-lye from time to time and to replace the phosphoric acid which has been consumed. At the same time a general purification of the mother-lye is undertaken by mixing at the same time the cold mother-lye containing phosphoric acid with an indeterminate but very small quantity of yellow prussiate of potash in solution. In presence of the phosphoric acid a precipitate is thus produced which chiefly consists of unknown bodies, which occur in the crude tartar and the raw materials, and which are very unfavorable to the manufacture of cream of tartar.

Having thus described my invention and the manner of employing the same, I claim—

1. The process herein described of manufacturing cream of tartar from argols, consisting in treating the dissolved argols with phosphoric acid or its compounds, and then clarifying and decolorizing it, as set forth.

2. The method herein described of manufacturing cream of tartar from argols, consisting in treating the dissolved argols with phosphoric acid or its compounds, boiling the mixture, clarifying it with clay, and finally decolorizing it with animal charcoal which has been previously treated with muriatic acid, as set forth.

In testimony whereof I have signed my name to this specification in the presence of two subscribing witnesses.

FRANZ DIETRICH.

Witnesses:
 EBERHARD WAUPERMANNY,
 WILHELM WAUPERMANNY.